United States Patent [19]
de Schepper et al.

[11] Patent Number: 5,743,368
[45] Date of Patent: Apr. 28, 1998

[54] AUTOMATIC TRANSMISSION CONTROL SYSTEM

[75] Inventors: Frank de Schepper, Venusberg, Belgium; Kenji Suzuki, Okazaki, Japan

[73] Assignee: Aisin AW Co., Ltd., Japan

[21] Appl. No.: 678,043

[22] Filed: Jul. 10, 1996

[30] Foreign Application Priority Data

Jul. 10, 1995 [JP] Japan ..................... 7-173243

[51] Int. Cl.⁶ ................ F16D 25/0638; F16H 61/00
[52] U.S. Cl. .................. 192/85 AA; 192/30 W; 192/109 F
[58] Field of Search ............... 192/85 AA, 109 F, 192/30 W, 52.4, 52.1; 477/180, 117; 91/1

[56] References Cited

U.S. PATENT DOCUMENTS

| | | | |
|---|---|---|---|
| 4,440,279 | 4/1984 | Schreiner | 192/30 W |
| 4,474,274 | 10/1984 | Lutz et al. | 192/30 W |
| 4,705,151 | 11/1987 | Leigh-Monstevens et al. | 192/111 A |
| 5,029,678 | 7/1991 | Koshizawa | 192/30 W X |
| 5,103,954 | 4/1992 | Muncke et al. | 192/109 F X |

FOREIGN PATENT DOCUMENTS 62221929  9/1987  Japan.

*Primary Examiner*—Rodney H. Bonck
*Attorney, Agent, or Firm*—Lorusso & Loud

[57] ABSTRACT

An automatic transmission control system includes a frictional engagement element formed of alternating radially inner and outer thin plates for selectively transmitting a torque. The control system further includes a hydraulic servo having a piston which selectively engages/disengages the frictional engagement element responsive to an oil pressure. An electric characteristic detector detects (monitors) an electric characteristic which changes with change in the apply force of the frictional engagement element; and an apply force control unit controls the apply force of the frictional engagement element. The electric characteristic detector includes a signal generator for generating an electric signal in accordance with the relative positions of two electrically conductive members, which move as the frictional engagement element is engaged/disengaged. The apply force control unit includes a hydraulic controller for controlling the oil pressure fed to the hydraulic servo, on the basis of the electric signal received from the signal generator.

9 Claims, 5 Drawing Sheets

AUTOMATIC TRANSMISSION CONTROL SYSTEM

BACKGROUND OF THE INVENTION

1. Field of the Invention

The present invention relates to a control system for an automatic transmission.

2. Related Art

In the conventional drive train, rotation generated by an engine is transmitted through a torque converter to a transmission, in which the speed is changed and transmitted to drive wheels. The transmission includes a gear unit composed of a plurality of gear elements, which are selectively engaged/disengaged by frictional engagement elements, i.e. clutches and brakes, to selectively transmit torque in one of a plurality of gear stages.

At the time of a speed change from one gear stage to another, the RPM of a predetermined rotary member is detected so that the engaging force (hereinafter "apply force") is controlled on the basis of the change in the RPM, as caused by the engagement or disengagement of the frictional engagement element, e.g. as disclosed in Japanese Patent Application Laid-Open No. 221929/1987.

In the automatic transmission of the prior art, wherein the apply force is controlled on the basis of the change in the RPM, caused by engagement/disengagement of the frictional engagement element, the RPM of the rotary member will not change until a predetermined time period has elapsed after the start of engagement/disengagement of the frictional engagement element, i.e. until torque transmission is started or stopped. This causes a delay in the response of the control of the apply force, thereby making it difficult to properly control the apply force.

SUMMARY OF THE INVENTION

Accordingly, an object of the present invention is solution of the above-described problems of the prior art and provision of an automatic transmission control system which can properly control the apply force until the start or stop of the transmission of the torque, when the fractional engaged element is engaged/disengaged.

According to one aspect of the present invention, therefore, there is provided an automatic transmission control system including: a frictional engagement element having alternating radially inner and outer thin plates which are selectively engaged to transmit a torque; a hydraulic servo for moving a piston, by feeding/discharging oil, to engage/disengage the frictional engagement element; electric characteristic detecting means for detecting an electric characteristic which changes with change in the apply force of the frictional engagement element; and an apply force control unit for controlling the apply force of the frictional engagement element.

The electric characteristic detecting means includes signal generating means for generating an electric signal in accordance with the relative positions of two electrically conductive members which move with the frictional engagement element. For example, an electric capacitance, as established between the two outer thin plates, may be detected whereby an output voltage corresponding to the detected electric capacitance is generated as an electric signal. As a result, an electric signal is generated simultaneously with the start of the engagement/disengagement of the frictional engagement element, without a response delay in the control system.

The apply force control unit includes hydraulic control means for controlling the oil pressure fed to the hydraulic servo, on the basis of the electric signal received from the signal generating means.

The apply force control unit includes: displacement computing means for computing relative displacement between the two electrically conductive members on the basis of the electric signal received from the signal generating means; apply force computing means for computing the apply force of the frictional engagement element on the basis of the computed displacement; and hydraulic control means for controlling the oil pressure fed to the hydraulic servo, on the basis of the computed apply force. On the basis of the electric signal sent from the signal generating means, first the relative displacement between the two electrically conductive members, and then the apply force of the frictional engagement element are computed.

In another aspect of the control system of the present invention, the automatic transmission control system further includes a corrugated member arranged between the two electrically conductive members. In this case, the change in the monitored electric characteristic will be increased for a given change in the apply force of the frictional engagement element so that it can be more easily detected.

When the piston is moved forward responsive to oil pressure fed to the hydraulic servo, the radially inner thin plate and the radially outer thin plates are pressed together by the piston and the frictional engagement element is thereby engaged. On the other hand, when the piston is retracted by draining the oil from the hydraulic servo, the inner thin plate and the outside thin plates separate from each other to release the frictional engagement element.

DESCRIPTION OF THE PREFERRED EMBODIMENT

An embodiment of the present invention will be described in detail with reference to the accompanying drawings.

Figure 1A:
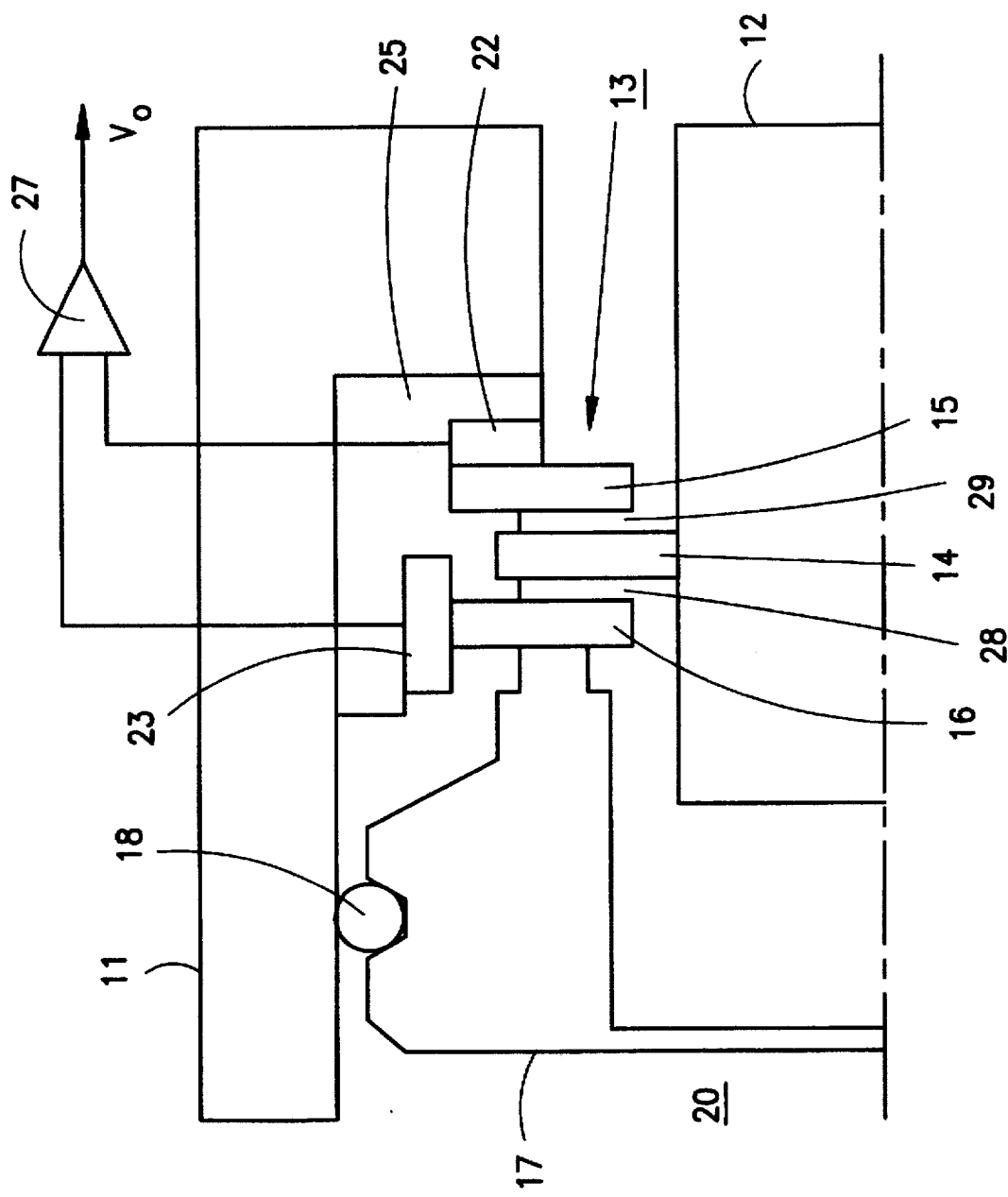
FIG. 1(A) is a block diagram of an automatic transmission control system according to an embodiment of the present invention.

As shown in FIG. 1(A), first and second engaging members 11, 12 are made of an electrically conductive material such as aluminum and are arranged on opposite sides of a frictional engagement element 13. The frictional engagement element 13 is a multiple-disc type clutch or brake. When the frictional engagement element 13 is a clutch, both the first member 11 and second member 12 are rotary members. When the frictional engagement element 13 is a brake, on the other hand, the first member is made stationary, e.g. by being fixed to the casing, while the second member 12 is a rotary member.

In order to transmit rotation between the first member 11 and the second member 12, an annular, radially inner thin plate 14, which is splined to the second member 12, is arranged between annular, radially outer thin plates 15 and 16, which are splined to the first member 11. The inner thin plate 14 and the outer thin plates 15 and 16 are usually each plural in number, although shown as single members for conveniences of description.

Figure 1B:
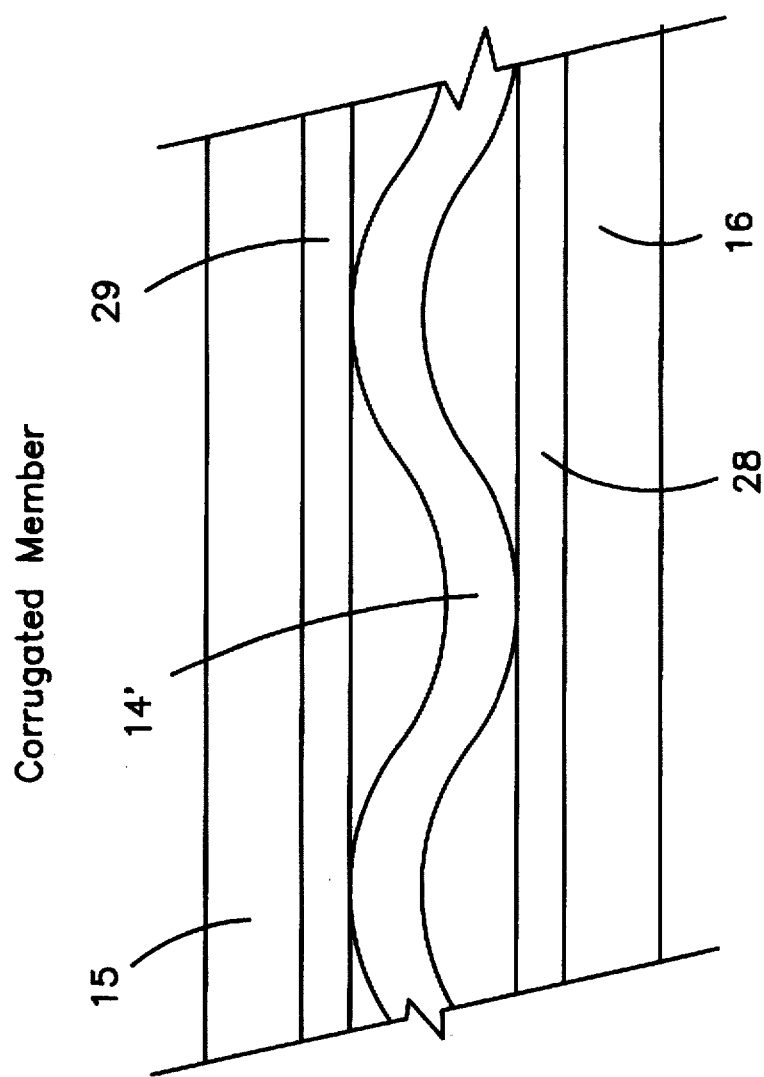
FIG. 1(B) is a schematic diagram of a second embodiment of the present invention.

FIG. 1(B) shows an alternative embodiment where an inner thin plate 14 is replaced by a corrugated inner thin plate 14'.

The inner thin plate 14 and the outer thin plates 15 are pressed together for engagement of element 13 by a piston 17 which is moved forward (or to the right in FIG. 1(A)), and are released from each other when the piston 17 is retracted (to the left in FIG. 1(A)).

The piston 17 forms a hydraulic servo in cooperation with a hydraulic servo cylinder, which is formed in the first member 11, and, together with the first member 11, defines an oil chamber 20. By feeding and discharging the oil to and from the oil chamber 20, the piston 17 can be moved forward and backward to engage and disengage the frictional engagement element 13. An O-ring 18 is arranged between the outer circumference of the piston 17 and the inner circumference of the first member 11 to provide a seal therebetween.

Friction elements 28 and 29 are fixed to at least one of the confronting faces of the inner thin plate 14 and the outer thin plates 15 and 16. As a result, a frictional force is established between the inner thin plate 14 and the outer thin plates 15 and 16 when the inner thin plate 14 and the outer thin plates 15 and 16 are pressed against each other.

In order that the apply force of the frictional engagement element 13 may be controlled when the frictional engagement element 13 is to be engaged/disengaged, the apply force is electrically metered. For this purpose, an electric capacitance, the monitored electric characteristic in this embodiment, is established between the outer thin plates 15 and 16 and is detected by a (not-shown) electric capacitance detecting means so that the apply force may be computed on the basis of the electric capacitance. Moreover, the outside thin plate 15 and a first electrode 22, and the outside thin plate 16 and a second electrode 23 are separately electrically connected so that a voltage may be established between the two outside thin plates 15 and 16 and detected. The aforementioned friction elements 28 and 29 may be made of paper, with the electric conductivity adjusted by an additive.

A ceramic insulating member 25 electrically insulates the first electrode 22 and the second electrode 23 from the first member 11.

Incidentally, in the present embodiment, the outer thin plates 15 and 16 face each other through the single inner thin plate 14 to establish the electric capacitance between the two outside thin plates 15 and 16. However, an electric capacitance can also be established individually (1) between the outer thin plate 15 and the inner thin plate 14 and (2) between the outer thin plate 16 and the inner thin plate 14. In other words, any two such electrically conductive members, may be used for this purpose provided their relative positions are changed as the piston 17 is moved to change the apply force. In a further example, one of the electrically conductive members may be the piston itself while the other such member would be the outer plate 15, the outer plate 16 or the inner plate 14.

The voltages, as output from the first electrode 22 and the second electrode 23, are fed to an amplifier 27 acting as signal generating means to output the output voltage Vo.

The following formula defines the relationship between a supply voltage Vcc, a reference capacity Cr and the electric capacitance Cx between the outer thin plates 15 and 16, with constants designated by K1 and Kz:

$$Vo = Vcc \times K1(1 - Kz \times Cr/Cx).$$

From this formula, therefore, the electric capacitance Cx can be calculated.

If the relative displacement between the outer thin plates 15 and 16 is designated d, if the dielectric constant of the oil fed between the outer thin plates 15 and 16 is designated $\epsilon$ and if the confronting area of the outer thin plates 15 and 16 is designated A, the following formula holds:

$$Cx = \epsilon \times A/d.$$

Hence, it is possible to compute the relative displacement d between the outer thin plates 15 and 16.

Figure 2:
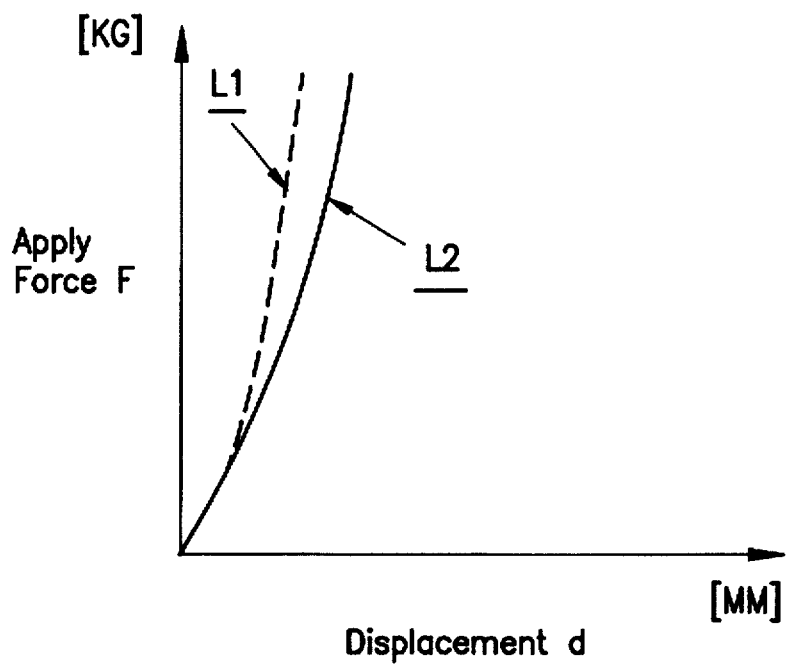
FIG. 2 is a graph of apply force (ordinate) versus displacement (abscissa), i.e. an apply force map, for the embodiment of FIG. 1(A)

Thus, an apply force computing means (not shown) determines the apply force F on the basis of the displacement d with reference to the map of FIG. 2. In this case, the inner thin plate 14 can be corrugated around its circumference, so that the change in the displacement d may be increased for a given apply force F.

In FIG. 2, a curve L1 represents the relationship between the displacement d and the apply force F when the inner thin plate 14 (of FIG. 1(A)) is flat, and a curve L2 represents the relationship between the displacement d and the apply force F when the inner thin plate 14 is corrugated.

Since the change in the displacement d can be enlarged for a given apply force F, the change in the output voltage Vo is likewise increased, making it easier to determine the change in the electric capacitance Cx.

Figure 3:
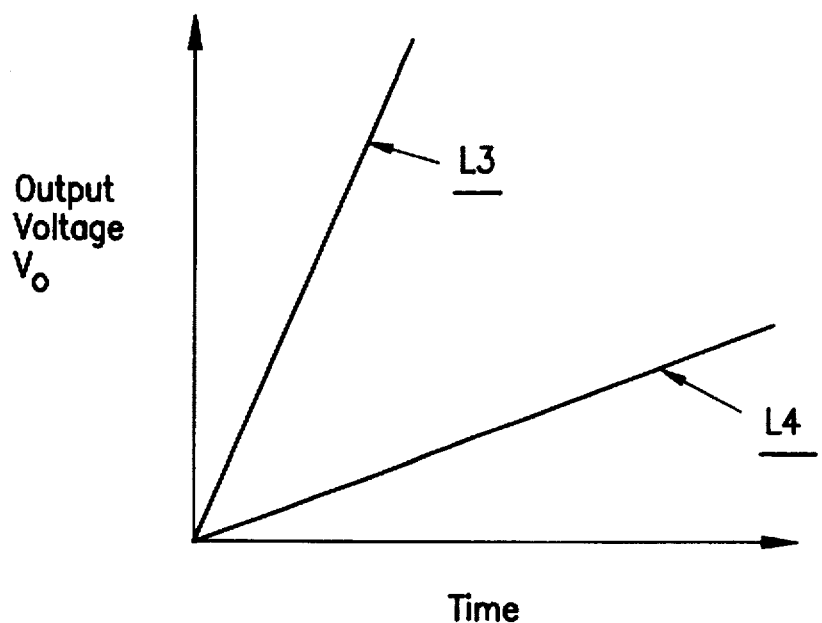
FIG. 3 is a graph of output-voltage (ordinate) versus time (abscissa) in the embodiment of FIG. 1(A)

In FIG. 3, line L3 represents the relationship between the time and the output voltage Vo when the inner thin plate 14 is flat, and line L4 represents the relationship between the time and the output voltage Vo when the inner thin plate 14 is corrugated. If the inside thin plate 14 is thus corrugated, it is possible to reduce the change in the output voltage Vo for a unit time period, thus making it easier to detect the electric capacitance Cx.

Figure 4:
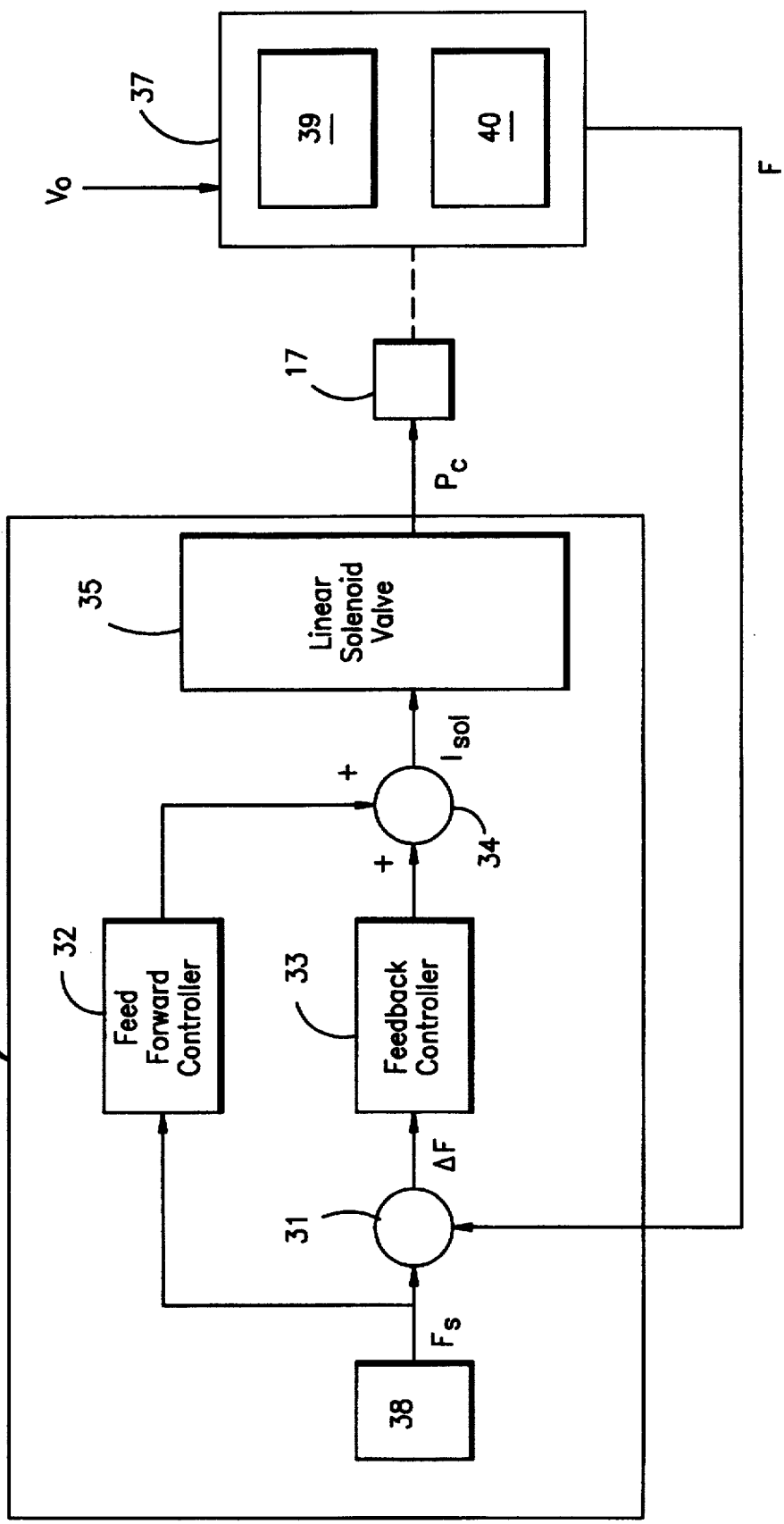
FIG. 4 is a block diagram of the apply force control unit in the embodiment of FIG. 1(A)

In FIG. 4 Fs designates an apply pressure command value, as preset and stored in data storage device or medium 38 in the apply force control unit, and letter F designates an actual apply force, as determined by apply force computing means 37, with reference to the map of FIG. 2. The apply pressure command value Fs and the apply force F are sent to a subtracter 31, in which the apply force F is subtracted from the apply pressure command value Fs to compute a deviation $\Delta F$.

As shown in FIG. 4 hydraulic control means 30 includes a feed forward controller 32, and a feedback controller 33. The apply pressure command value Fs and the deviation $\Delta F$ are individually multiplied by gains and output from the feed forward controller 32 and the feedback controller 33 and are added in an adder 34 so that a current command value $I_{SOL}$ is generated. Incidentally, the data storage device 38, the subtracter 31, the feed forward controller 32, the feedback controller 33, the adder 34 and a linear solenoid valve 35, together form hydraulic control means 30.

The current command value $I_{SOL}$ is sent to the linear solenoid valve 35, which generates a control oil pressure Pc corresponding to the current command value $I_{SOL}$ and feeds it to the hydraulic servo having the aforementioned piston 17. As a result, piston 17 is extended and the apply force computing means 37 computes the apply force F on the frictional engagement element 13 (of FIG. 1(A)).

The apply force computing means includes displacement computing means 39 for computing relative displacement between the two electrically conductive members (15 and 16 in FIG. 1(A)) and apply force computing means 40 for computing the force applied to the frictional engagement element 13 by the piston 17 on the basis of the computed relative displacement.

In the apply force detecting means 37, the electric capacitance Cx is computed on the basis of the output voltage Vo of the amplifier 27, and the displacement computing means computes the relative displacement d (of FIG. 2) between the outer thin plates 15 and 16 on the basis of the electric capacitance Cx so that the apply force F can be determined from the displacement d with reference to the map of FIG. 2.

Operations of the apply force control unit 30 will now be described with reference to the flow charts of FIGS. 5 and 6.

Step S1: A first sampling time τ is incremented. This first sampling time τ is exemplified by 2 [μs] in the present embodiment.

Step S2: The apply force is detected.

Figure 5:
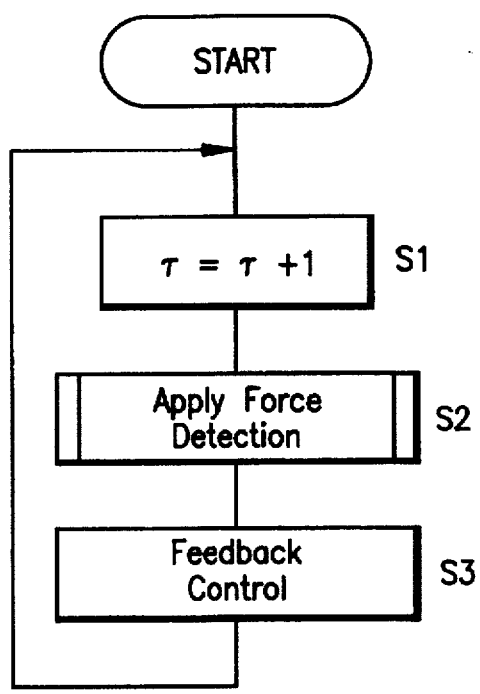
FIG. 5 is a flow chart of the main routine for operation of the apply force control unit in the embodiment of FIG. 1(A)
Figure 6:
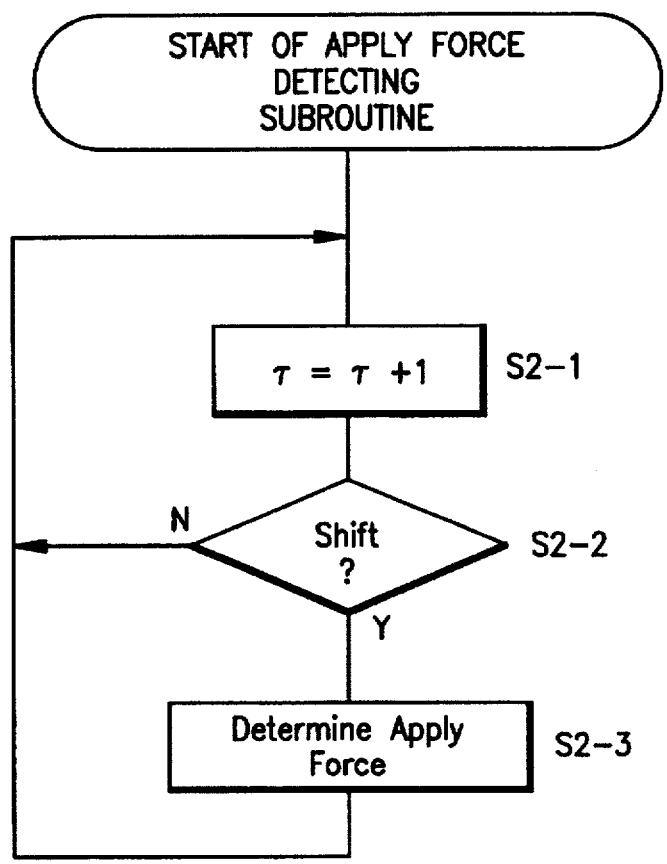
FIG. 6 is a flow chart for an apply force detecting subroutine in the embodiment of FIG. 1(A).

Step S3: Feedback control is executed based on the determined apply force;

The apply force detecting sub-routine of Step S2 of FIG. 5 is shown in FIG. 6 as including:

Step S2-1: A second sampling time t is incremented. This second sampling time t is exemplified by 10 [μs] in the present embodiment.

Step S2-2: It is decided whether or not a shift has been made. The sub-routine advances to Step S2-3, if the answer is YES, but returns to Step S2-1 if NOT.

Step S2-3: The apply force detecting means 37 determines the apply force F.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An automatic transmission control system comprising:

a frictional engagement element, including alternating radially inner and radially outer plates, for selectively transmitting torque responsive to an apply force;

a hydraulic servo including a piston mounted for movement between engagement with said frictional engagement element to impart the apply force thereto and disengagement from said frictional engagement element, responsive to feed of an oil pressure;

wherein two of said piston and said plates are electrically conductive members at least one of which moves relative to the other as said frictional engagement element is engaged/disengaged;

electric characteristic detecting means for detecting an electric characteristic which changes with the relative movement of said two electrically conductive members and which is related to the apply force of said frictional engagement element and for generating a characteristic signal representative of the detected electrical characteristic;

an apply force control unit for computing the apply force based on said characteristic signal and for generating an apply force signal in accordance with the computed apply force; and hydraulic control means for controlling the apply force of said frictional engagement element by controlling the feed of oil pressure to said hydraulic servo, responsive to the apply force signal.

2. A control system according to claim 1, wherein said apply force control unit includes: displacement computing means for computing a relative displacement between said two electrically conductive members on the basis of the characteristic signal; and apply force computing means for computing the apply force of said frictional engagement element on the basis of said computed relative displacement.

3. A control system according to claim 2, further comprising a corrugated member arranged between said two electrically conductive members.

4. A control system according to claim 1, further comprising a corrugated member arranged between said two electrically conductive members.

5. A control system according to claim 1 wherein said electrical characteristic is electric capacitance.

6. A control system according to claim 1 wherein said frictional engagement element further includes first and second elements formed of an electrically conductive material and carrying, respectively, said radially outer and radially inner alternating plates, a body of insulating material serving to electrically insulate the plates carried by one of said first and second elements from said electrically conductive material and means for impressing a voltage between two of the plates carried by said one element.

7. A control system according to claim 6 wherein said electrical characteristic is electrical capacitance between said two plates.

8. A control system according to claim 6 wherein said radially outer plates are splined to said first element and said radially inner plate is splined to said second element.

9. A control system according to claim 1 wherein said electrically conductive members are two of said radially outer plates separated by said radially inner plate.

* * * * *